(12) United States Patent
Buono et al.

(10) Patent No.: US 8,466,657 B2
(45) Date of Patent: Jun. 18, 2013

(54) AUTONOMOUS BALANCING OF SERIES CONNECTED CHARGE STORAGE DEVICES

(75) Inventors: Robert N. Buono, Ringwood, NJ (US); Philipe H. Gow, Woodstock, NY (US)

(73) Assignee: Bren-Tronics Batteries International, L.L.C., Commack, NY (US)

( * ) Notice: Subject to any disclaimer, the term of this patent is extended or adjusted under 35 U.S.C. 154(b) by 1230 days.

(21) Appl. No.: 12/262,672

(22) Filed: Oct. 31, 2008

(65) Prior Publication Data
US 2010/0109608 A1     May 6, 2010

(51) Int. Cl.
*H02J 7/00* (2006.01)
*H02J 3/00* (2006.01)

(52) U.S. Cl.
USPC .......... 320/121; 320/117; 320/120; 320/122; 320/135; 307/41

(58) Field of Classification Search
USPC ....................................................... 320/121
See application file for complete search history.

(56) References Cited

U.S. PATENT DOCUMENTS

| | | | |
|---|---|---|---|
| 5,898,291 A * | 4/1999 | Hall | 320/121 |
| 6,121,751 A | 9/2000 | Merritt | |
| 6,356,055 B1 | 3/2002 | Lin et al. | |
| 6,518,725 B2 | 2/2003 | Marten | |
| 6,624,612 B1 * | 9/2003 | Lundquist | 320/118 |
| 6,873,134 B2 | 3/2005 | Canter et al. | |
| 7,049,791 B2 * | 5/2006 | Lin et al. | 320/121 |
| 7,288,919 B2 * | 10/2007 | Morita | 320/116 |
| 7,378,818 B2 | 5/2008 | Fowler et al. | |
| 7,463,009 B2 * | 12/2008 | Chang et al. | 320/121 |
| 2001/0019256 A1 | 9/2001 | Olsson et al. | |
| 2003/0062874 A1 * | 4/2003 | Furukawa | 320/121 |
| 2005/0029987 A1 * | 2/2005 | Lin et al. | 320/119 |
| 2005/0077879 A1 * | 4/2005 | Near | 320/166 |
| 2008/0018300 A1 | 1/2008 | Zaag et al. | |
| 2008/0180061 A1 | 7/2008 | Koski et al. | |
| 2008/0197805 A1 | 8/2008 | Pellenc | |

OTHER PUBLICATIONS

PCT Search Report and Written Opinion for PCT/US2009/062742, mailed Jun. 10, 2010, completed by US ISA.

* cited by examiner

*Primary Examiner* — Yalkew Fantu
(74) *Attorney, Agent, or Firm* — Keusey & Associates, P.C.

(57) ABSTRACT

A charge balancing circuit implemented within a charge storage device (cell) in a series connected charge storage unit (battery) made up of a plurality of cells. The charge balancing circuit may utilize a controller to sense the voltage in the cell it is implemented therein and the cells adjacent thereto. If the voltage of the current cell exceeds a threshold voltage and is greater than at least one adjacent cell the current cell can transfer charge to the adjacent cell having the lowest voltage. The transfer of the charge is done with a switching network that extracts current from the current cell and then transfers the current to the adjacent cell having the lowest voltage. The switching network may utilize switches and a current storage device (inductor) to transfer the charge. The controller may activate different switches based on which adjacent cell has the lowest voltage.

20 Claims, 6 Drawing Sheets

AUTONOMOUS BALANCING OF SERIES CONNECTED CHARGE STORAGE DEVICES

BACKGROUND

When there is a need for energy storage at voltages greater than a single cell can provide, individual cells can be connected in a series arrangement to generate a higher voltage series connected battery. Mismatches between the cells may cause the cells to experience undervoltage or overvoltage conditions that are undesirable. Some cell chemistries may be particularly sensitive to the undervoltage or overvoltage conditions. The mismatches may be caused by manufacturing tolerances in the initial production of the cells, age difference between cells, or differences in the state of charge. Maintaining the cells in balance in order to avoid undervoltage or overvoltage conditions is a critical design goal that produces a reliable and safe battery having a long operating cycle life.

Maintaining the cells in balance may require charging and discharging individual cells. One method for discharging is resistive loading of individual cells. Though simple and low cost, the energy being discharged by this method is wasted as heat. Another method for charging includes connecting a current source to individual cells. The current source may be derived from the battery and require elaborate multiplexing or switching schemes to enable the current source to be connected to each cell. The elaborate multiplexing/switching scheme may require control circuits external to the battery and the breakdown voltage of the switches must be as high as the voltage of the overall battery stack. The single current source may also limit the charging to a single cell at a time.

An additional method may include transferring charge between adjacent cells using, for example, a capacitor that can be switched therebetween. Such an arrangement may limit the balancing to sets of adjacent cells. Another method may include complicated control and switching arrangements to transfer charge between cells. These systems may also require control circuits external to the battery and the breakdown voltage of the switches to be as high as the voltage of the overall battery stack.

What is needed is a simple means for autonomously transferring charge between cells without the need for elaborate control and switching. Enabling the charge to be transferred from cell to cell enables the components used therein to transfer the charge to have a lower breakdown voltage and thus be smaller and less costly.

SUMMARY OF THE INVENTION

A charge balancing circuit implemented within a charge storage device in a series connected charge storage unit made up of a plurality of charge storage devices. The charge balancing circuit may utilize a controller to sense the voltage in the charge storage device it is implemented therein and the charge storage devices adjacent thereto. If the charge in the current charge storage device exceeds a threshold charge and is greater than at least one adjacent charge storage device the current charge storage device can transfer charge to the adjacent charge storage device having the lowest charge. The transfer of the charge is done with a switching network that extracts current from the current charge storage device and then transfers the current to the adjacent charge storage device having the lowest charge. The switching network may utilize switches and a current storage device (inductor) to transfer the charge. The controller may activate different switches based on which adjacent charge storage device has the lowest charge.

A charge balancing circuit may be utilized in each cell of the series connected charge storage unit. This enables charge balancing to occur without the need for a central controller. Each charge balancing circuit can operate autonomously of the operation of any other charge balancing circuit. Each charge storage unit may be actively balancing simultaneously so that balancing of the overall series connected charge storage unit can occur quicker. The operation of the charge balancing circuit is not limited to any particular number or type of charge storage devices. As the charge balancing circuits are only sharing charge amongst a charge storage device and those adjacent thereto (three charge storage devices total) the components utilized therein and the connections therebetween need to only have a voltage rating that is greater than the sum of the voltages of the three charge storage devices. This enables lower power (and thus lower cost and size) semiconductor components and interconnects to be utilized. The low voltage components have low on-resistance resulting in less waste heat and higher efficiency.

BRIEF DESCRIPTION OF THE DRAWINGS

The present invention will hereinafter be described in conjunction with the appended drawing figures wherein like numerals denote like elements.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms are used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

Figure 1:
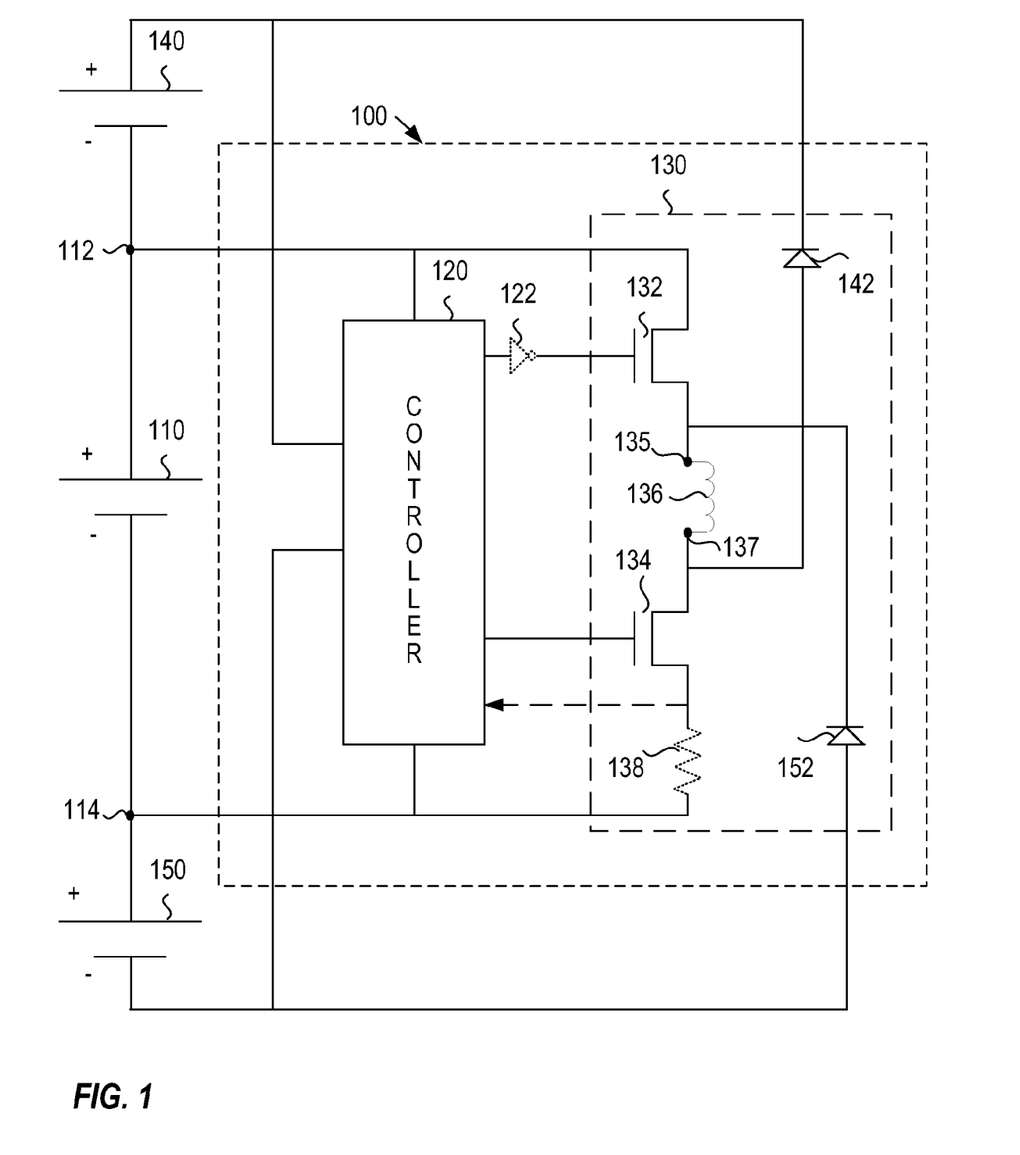
FIG. 1 illustrates a schematic diagram of an example charge balancing circuit included in a charge storage device, according to one embodiment.

FIG. 1 illustrates a schematic diagram of an example charge balancing circuit 100 included in a charge storage device 110 (first device, center device). The charge storage device 110 may be any device or group of devices having equal charge (voltage) that are arranged in series to create a higher charge than the individual devices (series connected charge storage unit). For example, the charge storage device 110 may be a cell or group of cells, a battery or group of batteries, or a capacitor or group of capacitors. It should be noted that for most charge storage devices, charge is analogous to voltage so that the charge of the charge storage device may be determined by measuring the voltage of the charge storage device.

The charge balancing circuit 100 is connectable to charge storage devices that are adjacent to the first device 110 in the series connected charge storage unit. As illustrated the charge balancing circuit 100 is connected to a charge storage device above 140 (second device, top device) and a charge storage device below 150 (third device, bottom device) the first device 110.

The charge balancing circuit 100 includes a controller 120 and a switching network 130. The controller 120 may be connected across each of the first, second and third devices 110, 140, 150. As illustrated, the controller 120 is connected to a first node 112 (positive terminal of the first device 110 and negative terminal of the second device 140) and a second node 114 (negative terminal of first device 110 and positive terminal of the third device 150) as well as a positive terminal of the second device 140 and a negative terminal of the third device 150. The controller 120 determines the voltage within each device 110, 140, 150 and based thereon may provide one or more control signals to the switching network 130 via one or more connections therebetween (two illustrated). The switching network 130 may provide a means for transferring charge from the first device 110 to either the second or third devices 140, 150 based on input from the controller 120. The switching network 130 may also be connected to the first device 110.

The switching network 130 may include a first switch 132, a second switch 134 and a current storage device 136. The first and second switches 132, 134 may be transistors and the current storage device 136 may be an inductor. The first switch 132 may switchably connect the first node 112 to a first end 135 of the current storage device 136 while the second switch 134 may switchably connect the second node 114 to a second end 137 of the current storage device 136. The first end 135 of the current storage device 136 may also be connected to the negative terminal of the third device 150 while the second end 137 may also be connected to the positive terminal of the second device 140. The switching network 130 may also include diodes 142, 152 between the current storage device 136 and the second and third devices 140, 150 respectively. The diodes 142, 152 are to ensure that current flows between the current storage device 136 and the second and third devices 140, 150 respectively in a certain direction. As arranged, the current will flow from the current storage device 136 to the positive terminal of the second device 140 and from the negative terminal of the third device 150 to the current storage device 136 (to be discussed in more detail later).

In operation when both switches are on (closed) the first device 110 is connected in parallel with the current storage device 136 so that current flowing from the first device 110 is stored in the current storage device 136 (current ramp up of the current storage device 136). In this arrangement the current is discharged from the first device 110 and charge is removed.

When the first switch 132 is on (closed) and the second switch 134 is off (open) the current storage device 136 is connected in parallel with the second device 140 so that the current stored in the current storage device 136 is provided to the second device 140 and the charge in the second device 140 is increased. In this arrangement, the charge balancing circuit 100 is acting as a boost converter where current is provided to the positive terminal of the second device 140.

When the second switch 134 is on (closed) and the first switch 132 is off (open) the current storage device 136 is connected in parallel with the third device 150 so that the current stored in the current storage device 136 is provided to the third device 150 and the charge in the third device 150 is increased. In this arrangement, the charge balancing circuit 100 is acting as an inverter where current flows from the negative terminal of the third device 150.

When controller 120 determines that the first device 110 may transfer charge it may activate the appropriate signals (e.g., turn high) in order to turn on (close) the appropriate switches. As the supply voltage applied to each of the first and second switches 132, 134 is different it may be necessary to invert one of the signals in order to cause the switch to turn on. The embodiment illustrated in FIG. 1 includes the signal provided to the first switch 132 being inverted by inverter 122.

Figure 2:
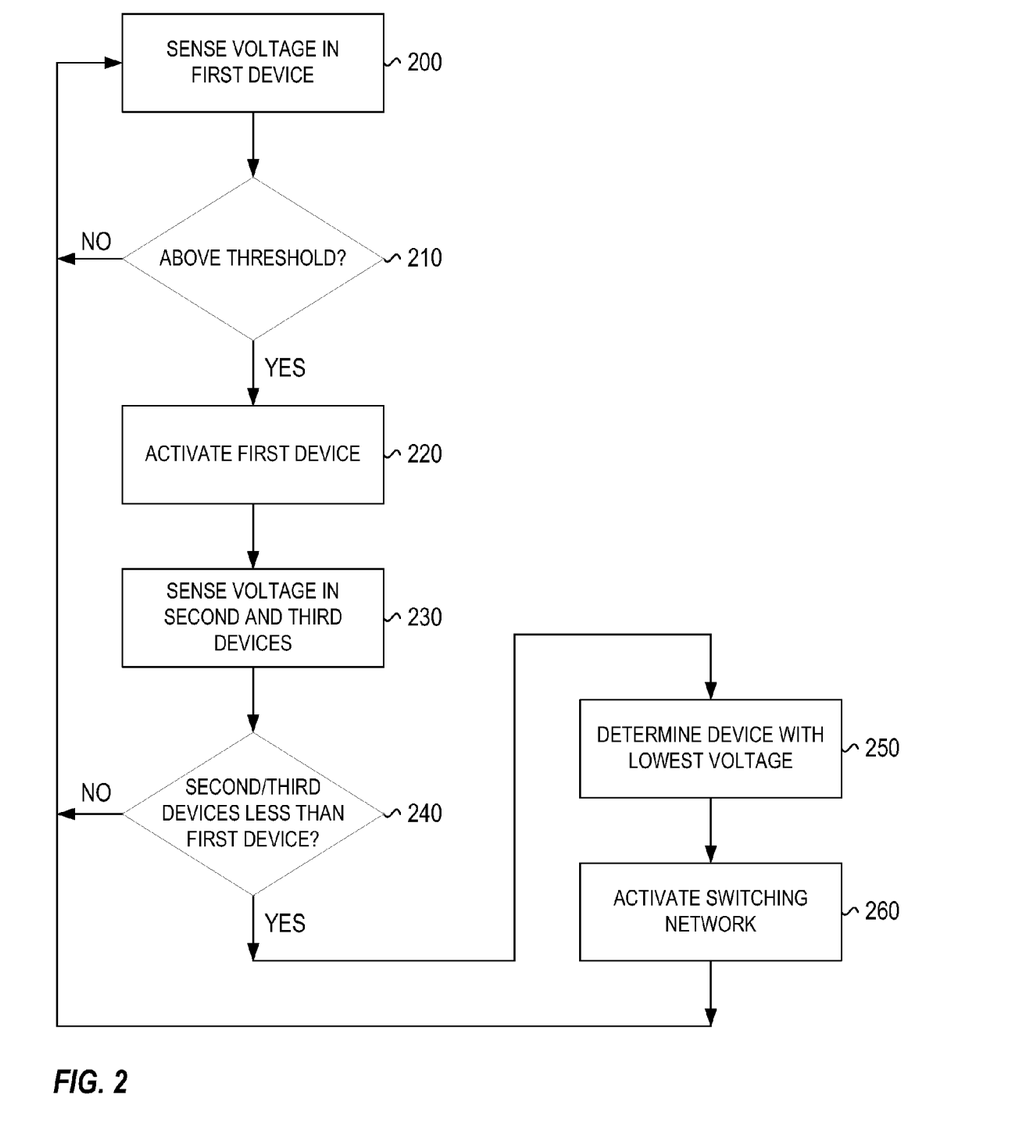
FIG. 2 illustrates an example process flow for the operation of an example controller used in the example charge balancing circuit, according to one embodiment.

FIG. 2 illustrates an example process flow for the operation of an example controller (120 of FIG. 1). Initially, the controller determines what the voltage of the first device (the device that the controller is within) is 200. A determination is then made as to whether the voltage is above some defined threshold voltage 210. If the voltage is not above the threshold voltage 210 No the process begins again (possibly after some delay). If the voltage is above the threshold voltage 210 Yes the first device is activated (is capable of transferring charge) 220. The controller then senses the voltage of the second and third devices (the devices adjacent to the first device) 230. It should be noted that if the charge balancing circuit was implemented in a first or last device in a series connected charge storage unit, the first or last device would only have one adjacent device and the controller would only be capable of sensing the voltage of that one adjacent device. The controller could still be implemented to be capable of sensing the voltage in two adjacent devices (as the rest of the controllers would be) but would only be connected to one adjacent device (the other connection may be unused).

A determination is then made as to whether the voltage of either the second or third device is less than the first device 240. If neither device has lower voltage then the first device 240 No the process begins again (possibly after some delay). If the voltage of one or both of the second/third devices is less than the first device 240 Yes a determination is made as to which one has the lowest voltage 250. Based on which device has the lowest voltage the controller activates the switching network 260 (to be described in more detail with regard to FIGS. 3A-B). It should be noted that if no charge sharing is to be done for the first device, then both switches would be in the off (open) position so that no current would flow or charge would be removed from the first device.

The operation of the controller is in no way intended to be limited to the embodiment illustrated in FIG. 2 and described with respect thereto. Steps may be rearranged, combined, split apart, and/or modified without departing from the current scope. Moreover, any process for comparing three voltages and determining which one has the lowest voltage and if charge should be transferred thereto is considered to be covered by the current scope.

Figure 3A:
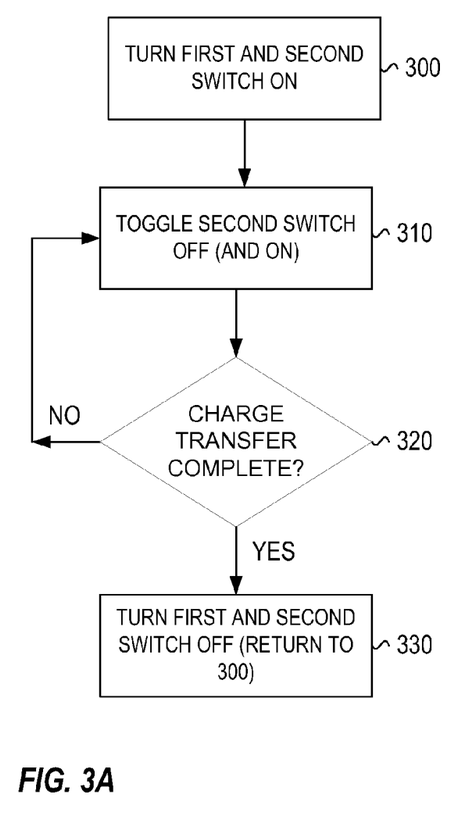
FIG. 3A illustrates an example process flow for the activation of an example switching network utilized to operate the example charge balancing circuit as a boost converter, according to one embodiment.

FIG. 3A illustrates an example process flow for the activation of the switching network (130 of FIG. 1) to utilize the charge balancing circuit as a boost converter. Initially, the controller provides input to both the first and the second switches to cause the switches to turn on (close) so that current flows into and is stored by the current storage device (current ramp up) 300. After some defined period, the second switch is turned off so that the current stored in the current storage device may be provided to the second device 310. The second switch may be toggled between on and off so that current is built up in the current storage device and then transferred to the second device each toggle cycle.

The period that the both switches are on and the period that the second switch is off may be based on various parameters defined by the controller. For example, one or both of the periods may be based on a defined period of time that may be the same or may be different. Alternatively, one or both of the periods may be based on how much current has flowed (current mode). Referring back to FIG. 1, the switching network 130 may include a current sensing resistor 138 that provides an input to the controller 120. The controller 120 may control the time that the second switch is on and/or off based on the current mode of the switching network 130. The controller 120 may be configured as a current mode controller, or as a constant on-time converter or a constant off-time converter with or without current sensing.

The size of the current storage device 136 may be determined by the timing of the toggling of the second switch 134 or the current mode that is utilized to toggle the second switch 134. Toggling the second switch 134 at a high rate (e.g., 100 KHz) allows for a small current storage device to be utilized in the charge balancing circuit 100.

Referring again to FIG. 3A, a determination is made as to whether the charge transfer is complete 320. The determination may be based on a defined period that may be either time, cycles of toggling, or current mode. Alternatively, the determination may be based on voltage sensing. For example, the determination may be based on the voltages of the first and second devices equalizing, the voltage of the third device becoming the lowest voltage, or the voltage of the first device dipping below the threshold. Regardless of what determination method is utilized, if the determination is that the charge transfer is not complete 320 No then the toggling of the second switch continues. If the charge transfer is determined to be complete 320 Yes the first and second switches are turned off and the process returns to 200 of FIG. 2, optionally after a delay.

The process flow for the boost converter operation of the charge balancing circuit is in no way intended to be limited to the embodiment illustrated in FIG. 3A and described with respect thereto. Steps may be rearranged, combined, split apart, and/or modified without departing from the current scope.

Figure 3B:
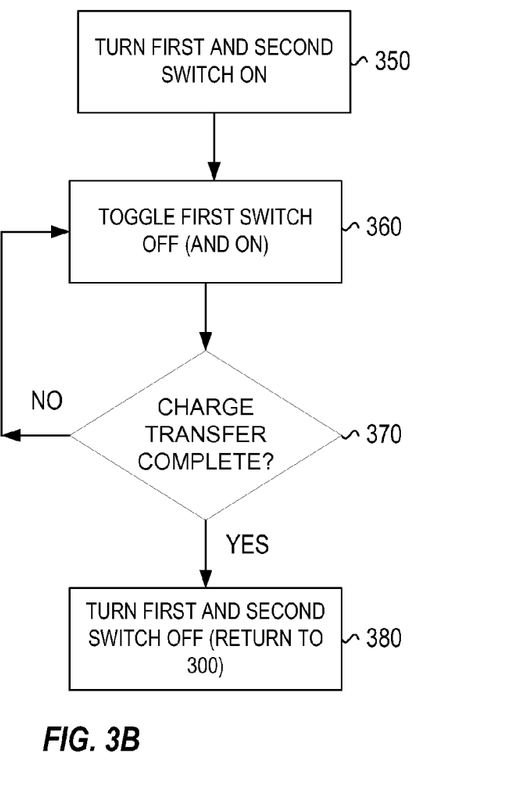
FIG. 3B illustrates an example process flow for the activation of an example switching network utilized to operate the example charge balancing circuit as an inverter, according to one embodiment.

FIG. 3B illustrates an example process flow for the activation of the switching network to utilize the charge balancing circuit as an inverter. Initially, the controller provides input to both the first and the second switches to cause the switches to turn on (close) so that current flows into and is stored by the current storage device (current ramp up) 350. After some defined period, the first switch is turned off so that the current stored in the current storage device may be provided to the third device 360. The first switch may be toggled between on and off so that current is built up in the current storage device and then transferred to the third device. A determination is made as to whether the charge transfer is complete 370. If the determination is that the charge transfer is not complete 370 No then the toggling of the first switch continues. If the charge transfer is determined to be complete 370 Yes the first and second switches are turned off and the process returns to 200 of FIG. 2, optionally after a delay.

As discussed above with respect to FIG. 3A, the size of the current storage device 136 may be determined by the timing of the toggling of the second switch 134 or the current mode that is utilized to toggle the second switch 134.

The process flow for the inverter operation of the charge balancing circuit is in no way intended to be limited to the embodiment illustrated in FIG. 3B and described with respect thereto. Steps may be rearranged, combined, split apart, and/or modified without departing from the current scope.

Figure 4A:
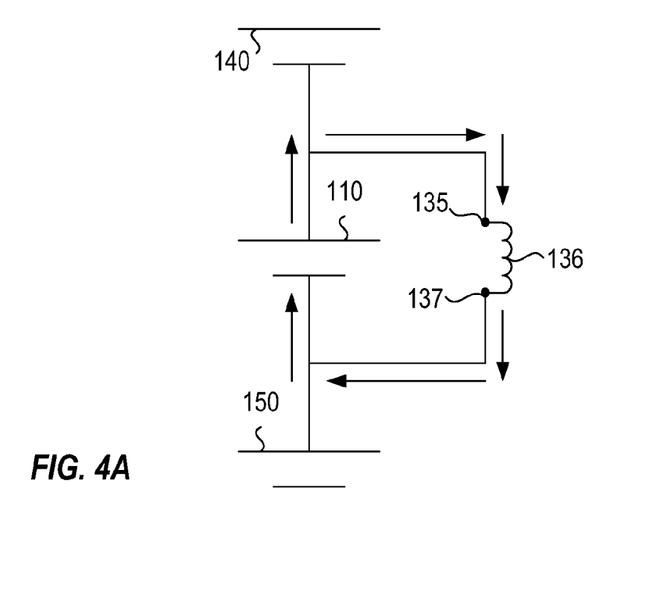
FIGS. 4A-C illustrate example current flows for various modes of the example charge balancing circuit, according to one embodiment.
Figure 4B:
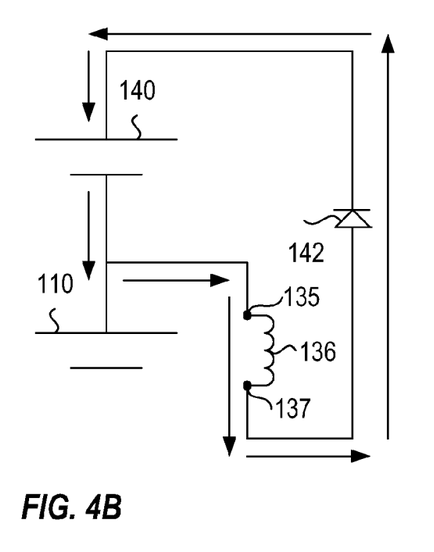
Figure 4C:
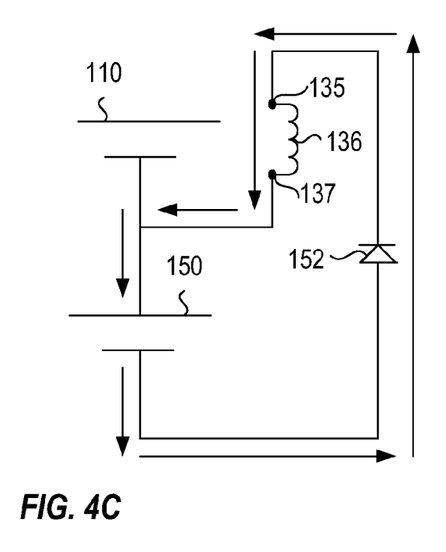

FIGS. 4A-C illustrate example current flows for various modes of the charge balancing circuit. FIG. 4A illustrates an example current flow when the charge balancing circuit 100 is in current ramp mode (both switches are closed). Current flows from the first device 110 to the current storage device 136. FIG. 4B illustrates an example current flow when the charge balancing circuit 100 is in a boost converter mode (first switch on, second switch off). Current flows from the current storage device 136 to the second device 140 (to positive terminal of second device 140). FIG. 4C illustrates an example current flow when the charge balancing circuit 100 is in an inverter mode (first switch off, second switch on). Current flows from the third device 150 (from negative terminal of third device 150) to the current storage device 136.

Figure 5:
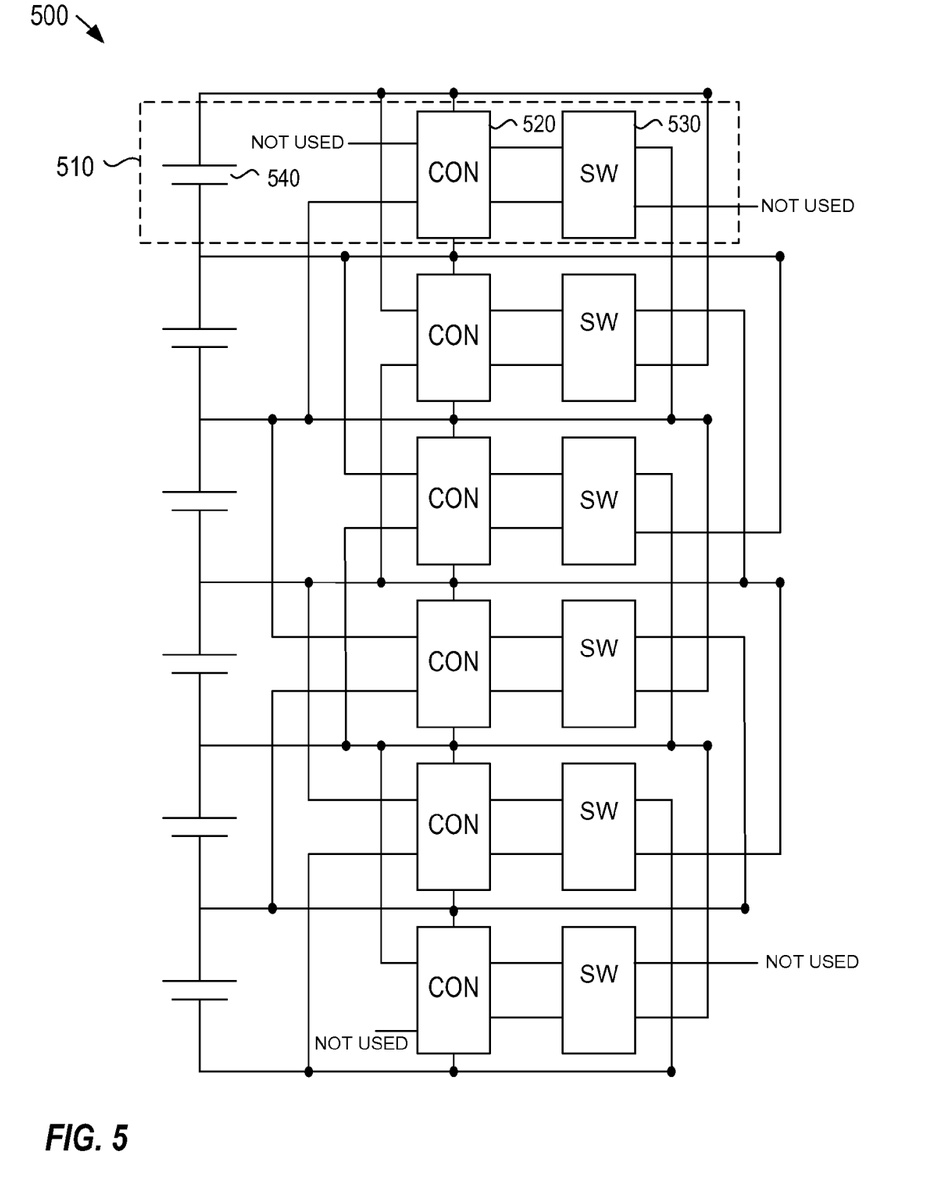
FIG. 5 illustrates an example series connected charge storage unit made up of a plurality of charge storage devices containing the example charge balancing circuit, according to one embodiment.

FIG. 5 illustrates an example series connected charge storage unit 500 (e.g., battery) made up of a plurality (6 illustrated) of charge storage devices 510 (e.g., cells). Each cell 510 includes a charge balancing circuit, made up of a controller 520 and a switching network 530, in addition to a storage unit 540. The controller 520 and switching network 530 within each cell 510 are connectable to the adjacent cells? (e.g., cells above and below). The controller in a particular cell (e.g., the second cell) could sense its voltage and the voltage of the cells above and below (e.g., first and third cells) and be capable of operating the switching network to provide charge to the cells above and below.

The top and bottom cells of the battery 500 may contain the same charge balancing circuit but may not connect the controller 520 and switching network 530 to an upper and lower cell respectively. The connections to the upper and lower cells respectively may be unused. Accordingly, the controller 520 in these cells would not sense a voltage for the upper or lower cell respectively or activate a switch to transfer charge thereto. For example, the controller in a first cell could sense its charge and the charge of the second cell and be capable of operating the switching network to provide charge to the second cell.

Utilizing a charge balancing circuit in each cell of a series connected battery enables charge balancing to occur without the need for a central controller. Each charge balancing circuit can operate autonomously of the operation of any other charge balancing circuit. Each charge cell may be actively balancing simultaneously so that balancing of the overall battery can occur quicker. The operation of the charge balancing circuit is not limited to any particular number or type of cells. As the charge balancing circuits are only sharing charge amongst a cell and those adjacent thereto (three cells total) the components utilized therein and the connections between the cells need to only have a voltage rating that is greater than the sum of the voltages of the three cells. This enables lower power (and thus lower cost and size) semiconductor components and interconnects to be utilized. The low voltage components have low on-resistance resulting in less waste heat and higher efficiency.

Figure 6:
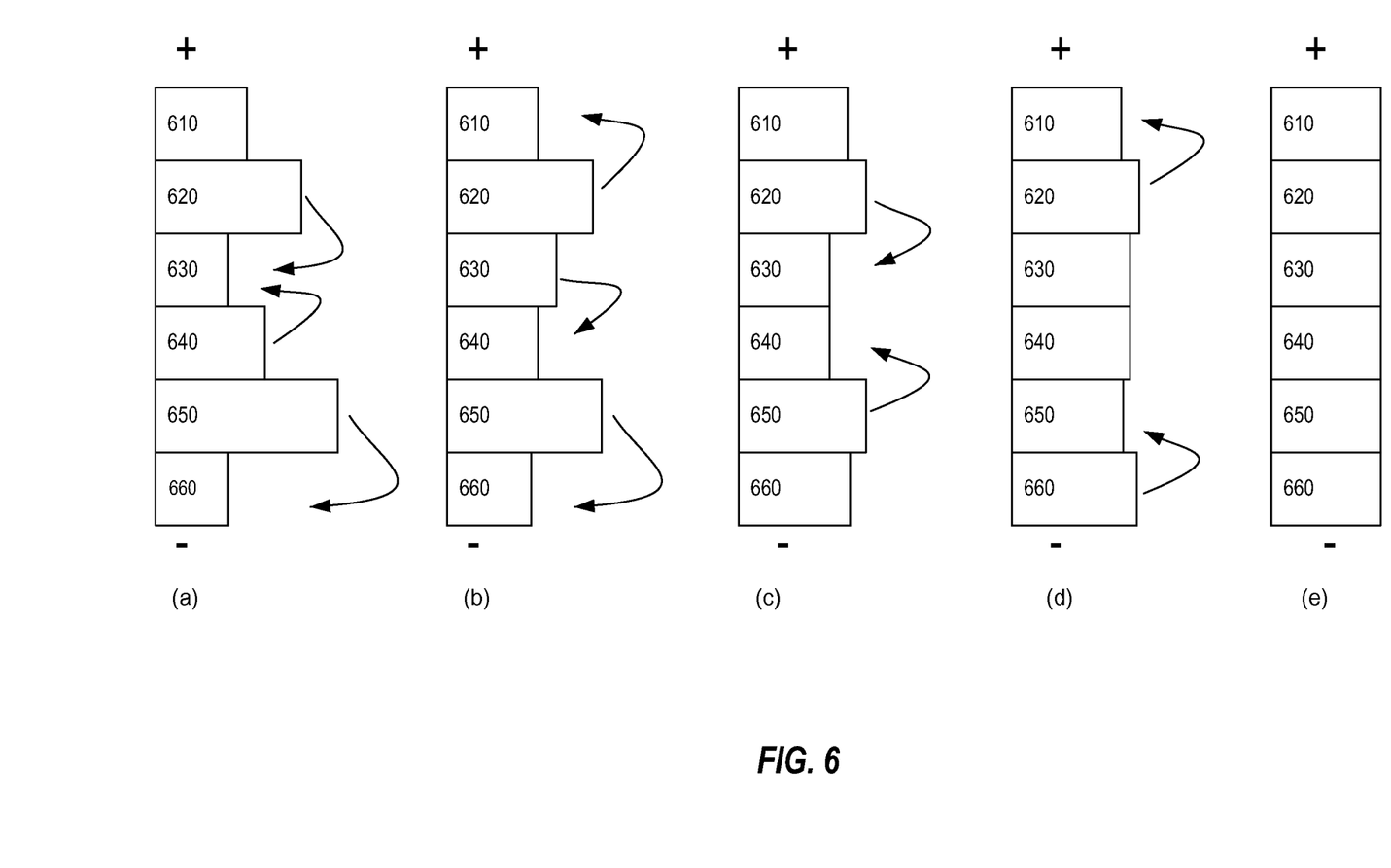
FIG. 6 illustrates an example operational flow of charge between charge storage devices in the series connected charge storage unit, according to one embodiment.

FIG. 6 illustrates an example operational flow of charge between charge storage devices (cells) in a series connected charge storage unit (battery). The battery includes six cells 610-660. In (a) the cells are unbalanced and a charge sharing determination is made in each cell. Cells 610, 630, and 660 determine that their charge is lower than the charge in connected cells (top and bottom for cell 630, bottom for cell 610, and top for cell 660) so that these cells do not transfer any charge. Cell 620 determines that cell 630 is the cell connected thereto that has the least charge so transfers charge thereto (inverter mode). Cell 640 determines that cell 630 is the cell connected thereto that has the least charge so transfers charge thereto (boost mode). Cell 650 determines that cell 660 is the cell connected thereto that has the least charge so transfers charge thereto (inverter mode).

In (b) the cells are still unbalanced after some period of time and charge transfer and a new determination is made by each cell balancing device with regard to transferring charge. Cells 610, 640 and 660 determine that their charge is lower than the charge in connected cells so that these cells do not transfer any charge. Cell 620 determines that cell 610 is the cell connected thereto that has the least charge so transfers charge thereto (boost mode). Cell 630 determines that cell 640 is the cell connected thereto that has the least charge so transfers charge thereto (inverter mode). Cell 650 determines that cell 660 is the cell connected thereto that has the least charge so transfers charge thereto (inverter mode).

In (c) the cells are still unbalanced after some period of time and charge transfer and a new determination is made by each cell balancing device with regard to transferring charge. Cells 610, 630, 640 and 660 determine that their charge is lower than the charge in connected cells so that these cells do not transfer any charge. Cell 620 determines that cell 630 is the cell connected thereto that has the least charge so transfers charge thereto (inverter mode). Cell 650 determines that cell 640 is the cell connected thereto that has the least charge so transfers charge thereto (boost mode).

In (d) the cells are still unbalanced after some period of time and charge transfer and a new determination is made by each cell balancing device with regard to transferring charge. Cells 610, 630, 640 and 650 determine that their charge is lower than the charge in connected cells so that these cells do not transfer any charge. Cell 620 determines that cell 610 is the cell connected thereto that has the least charge so transfers charge thereto (boost mode). Cell 660 determines that cell 650 is the cell connected thereto that has the least charge so transfers charge thereto (boost mode).

In (e) the cells are balanced.

Although the disclosure has been illustrated by reference to specific embodiments, it will be apparent that the disclosure is not limited thereto as various changes and modifications may be made thereto without departing from the scope. It is understood, therefore, that the scope is not limited to the particular examples and implementations disclosed herein, but is intended to cover modifications within the spirit and scope thereof. Certain terminology was used herein to describe certain embodiments for convenience only and is not to be taken as a limitation on the embodiments described.

Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims. While the principles of the invention have been described above in connection with preferred embodiments, it is to be clearly understood that this description is made only by way of example and not as a limitation of the scope of the invention.

The invention claimed is:

1. An apparatus comprising:
    a controller connectable to each of three series connected charge storage devices to monitor voltage of each of the three series connected devices; and
    a switching network connectable to each of the three series connected devices to switchably connect a center device of the three series connected devices to either a top device of the three series connected devices or a bottom device of the three series connected devices to transfer charge from the center device, wherein the switching network operates responsive to the controller,
    wherein the controller instructs the switching network to connect the center device to the top device if the top device has lowest voltage of the three series connected devices and to the bottom device if the bottom device has lowest voltage of the three series connected devices.

2. The apparatus of claim 1, wherein the controller instructs the switching network to connect the center device to one of the top or the bottom devices only if the voltage of the center device exceeds a threshold voltage.

3. The apparatus of claim 1, wherein the switching network includes a first switch, a second switch and a current storage device, wherein the first switch and the second switch switchably connect the center device to the current storage device and the current storage device to either the top device or the bottom device.

4. The apparatus of claim 3, wherein the current storage device is an inductor.

5. The apparatus of claim 3, wherein the first and the second switches are transistors.

6. The apparatus of claim 3, wherein the current storage device is to extract charge from the center device in the form of current and to provide the current to the top device or the bottom device to provide charge thereto.

7. The apparatus of claim 6, wherein the current storage device extracts charge from the first device when both the first switch and the second switch are closed.

8. The apparatus of claim 7, wherein the current storage device provides charge in the form of current to one of the top or the bottom devices when an appropriate one of the first or the second switches are open.

9. The apparatus of claim 1, wherein the charge storage devices are cells.

10. The apparatus of claim 1, wherein the charge storage devices are batteries.

11. An apparatus comprising;
    a battery including a plurality of cells connected in series, each of the plurality of cells having at least one adjacent cell; and
    a plurality of charge balancing circuits, each of the plurality of charge balancing circuits being associated with one of the plurality of cells and each of the at least one adjacent cell, wherein each of the plurality of charge balancing circuits includes a controller adapted to detect the respective voltages of the associated one of the plurality of cells and each of the at least one adjacent cell, and a switching network adapted to transfer charge from the associated one of the plurality of cells to the at least one adjacent cell having lowest voltage if the voltage of the associated one of the plurality of cells is greater than each of the at least one adjacent cell, while maintaining the plurality of cells in series, wherein each switching network includes a first switch, a second switch and a current storage device, wherein the first switch and the second switch switchably connect the associated cell to the current storage device and the current storage device to the at least one adjacent cell having the lowest voltage.

12. The apparatus of claim 11, wherein operation of each of the charge balancing circuits is autonomous.

13. The apparatus of claim 11, wherein the current storage device is an inductor and the first and the second switches are transistors.

14. The apparatus of claim 11, wherein when the controller determines an adjacent cell at a higher potential has the lowest voltage the charge balancing circuit acts as a boost converter to charge the adjacent cell; and when the controller determines an adjacent cell at a lower potential has the lowest charge the charge balancing circuit acts as an inverter to charge the adjacent cell.

15. A method comprising;

detecting voltage of a first charge storage device and at least one adjacent charge storage device in a charge storage unit made up of a plurality of series connected charge storage devices;

transferring charge from the first storage device to the at least one adjacent charge storage device having lowest voltage, while maintaining the plurality of cells in series, if the voltage of the first charge storage device is greater than each of the at least one adjacent charge storage device; and wherein the transferring includes connecting the first charge storage device to a current storage device to extract charge in the form of current and then connecting the current storage device to the at least one adjacent charge storage device having the lowest voltage.

16. The method of claim 15, further comprising determining if the voltage in the first charge storage device is at least at a threshold voltage, and wherein the transferring is responsive to a positive determination of threshold voltage being met.

17. The method of claim 15, wherein the connecting the first charge storage device to a current storage device includes closing a plurality of switches switchably connecting the first charge storage device and the current storage device; and the connecting the current storage device to the at least one adjacent charge storage device having the lowest voltage includes opening an appropriate switch.

18. The apparatus of claim 11, wherein the switching network is adapted to transfer charge from the associated one of the plurality of cells to the at least one adjacent cell having lowest voltage only if the voltage of the associated one of the plurality of cells exceeds a threshold voltage.

19. The apparatus of claim 1, wherein the apparatus comprises no charge storage devices in addition to the three series connected charge storage devices.

20. The apparatus of claim 15, wherein the transferring step includes connecting the current storage device to only the at least one adjacent charge storage device that has the lowest voltage.

* * * * *